(12) United States Patent
Classen et al.

(10) Patent No.: US 8,915,137 B2
(45) Date of Patent: Dec. 23, 2014

(54) YAW RATE SENSOR, YAW RATE SENSOR SYSTEM, AND METHOD FOR OPERATING A YAW RATE SENSOR

(75) Inventors: Johannes Classen, Reutlingen (DE); Torsten Ohms, Vaihingen/Enz-Aurich (DE); Daniel Christoph Meisel, Vaihingen An der Enz (DE); Joerg Hauer, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 674 days.

(21) Appl. No.: 12/897,367

(22) Filed: Oct. 4, 2010

(65) Prior Publication Data

US 2011/0079079 A1    Apr. 7, 2011

(30) Foreign Application Priority Data

Oct. 7, 2009  (DE) .......................... 10 2009 045 420

(51) Int. Cl.
  *G01P 3/44*    (2006.01)
  *G01C 19/574*  (2012.01)
  *G01C 19/5755* (2012.01)

(52) U.S. Cl.
  CPC .......... *G01C 19/5755* (2013.01); *G01C 19/574* (2013.01)
  USPC ...................................... 73/504.12

(58) Field of Classification Search
  CPC .. G01C 19/5755; G01C 19/574; G01C 19/56; G01C 19/5776
  USPC ...................................... 73/504.12
  See application file for complete search history.

(56) References Cited

U.S. PATENT DOCUMENTS

2003/0154788 A1* 8/2003 Willig et al. ............... 73/504.02
2008/0242049 A1* 10/2008 Jung et al. ..................... 438/457

FOREIGN PATENT DOCUMENTS

WO   2009/062786   5/2009

* cited by examiner

*Primary Examiner* — Hezron E Williams
*Assistant Examiner* — Gregory J Redmann
(74) *Attorney, Agent, or Firm* — Kenyon & Kenyon LLP (57) ABSTRACT

A yaw rate sensor having a substrate which has a main plane of extension, and a Coriolis element is proposed. The Coriolis element is excitable to a vibration along a third direction which is perpendicular to the main plane of extension. A Coriolis deflection of the Coriolis element along a first direction which is parallel to the main plane of extension may be detected using a detection arrangement. The detection arrangement includes a Coriolis electrode which is connected to the Coriolis element, and a corresponding counterelectrode. Both the Coriolis electrode and the counterelectrode may be excited to a vibration along the third direction.

4 Claims, 6 Drawing Sheets

YAW RATE SENSOR, YAW RATE SENSOR SYSTEM, AND METHOD FOR OPERATING A YAW RATE SENSOR

RELATED APPLICATION INFORMATION

The present application claims priority to and the benefit of German patent application no. 10 2009 045 420.9, which was filed in Germany on Oct. 7, 2009, the disclosure of which is incorporated herein by reference.

FIELD OF THE INVENTION

The present invention is directed to a yaw rate sensor.

BACKGROUND INFORMATION

Yaw rate sensors are believed to be generally available. For example, a yaw rate sensor is discussed in WO 2009/062786 A1, and it has a substrate and a plurality of movable substructures which are situated over a surface of the substrate, the movable substructures being coupled to a shared spring element, and an arrangement being provided to excite the movable substructures to a coupled vibration in a plane parallel to the surface of the substrate, and the movable substructures having Coriolis elements, and an arrangement being provided to detect deflections of the Coriolis elements caused by a Coriolis force, a first Coriolis element being provided for detecting a yaw rate about a first axis, and a second Coriolis element being provided for detecting a yaw rate about a second axis which is perpendicular to the first axis.

SUMMARY OF THE INVENTION

The yaw rate sensor according to the exemplary embodiments and/or exemplary methods of the present invention, the yaw rate sensor system according to the exemplary embodiments and/or exemplary methods of the present invention, and the method according to the present invention for operating a yaw rate sensor according to the other description herein have the advantage over the related art that a yaw rate about a rotational axis oriented parallel to the main plane of extension may be detected via a Coriolis deflection which likewise is oriented essentially parallel to the main plane of extension and perpendicular to the rotational axis. Both the Coriolis electrode and the counterelectrode of the detection arrangement are advantageously excited to a vibration perpendicular to the main plane of extension, so that no interference signals are generated by a relative motion between the Coriolis electrode and the counterelectrode along the third direction. This is achieved in particular by the counterelectrode not being fixedly anchored to the substrate, but, rather, being moved together with the Coriolis element along the third direction. Therefore, a change in capacitance between the Coriolis electrode and the counterelectrode in particular is not induced by a motion of the Coriolis element perpendicular to the main plane of extension; instead, such a change in capacitance is caused primarily by the yaw rate, so that the yaw rate may be detected with greater precision via the change in capacitance. The substrate may include a semiconductor substrate, in particular a silicon substrate.

Advantageous embodiments and refinements of the exemplary embodiments and/or exemplary methods of the present invention are further described herein, as well as the description with reference to the drawings.

According to one refinement, it is provided that the yaw rate sensor has a drive frame which is coupled to the Coriolis element and which may be excited to a vibration along the third direction, the counterelectrode being connected to the drive frame, and the counterelectrode may be electrically insulated from the Coriolis element via an insulating element. Similarly, the Coriolis element and the counterelectrode, situated equidistantly from the drive frame, are advantageously excited to a vibration along the third direction, so that the Coriolis electrode and the counterelectrode are synchronized to one another with regard to the vibration along the third direction. The drive frame may be excited using substrate-mounted flat electrodes which in particular are situated between the drive frame and the substrate, perpendicular to the main plane of extension. Alternatively, the flat electrodes are designed as cover electrodes, so that the drive frame is situated between the cover electrodes and the substrate, perpendicular to the main plane of extension. The counterelectrode (also referred to as the detection counterelectrode) may be electrically insulated from the Coriolis element, so that the electrical capacitance between the Coriolis electrode and the counterelectrode may be measured via the difference in potential between the Coriolis electrode and the counterelectrode. The insulating element may be positioned in the area of the drive frame or of the Coriolis element, and in particular includes an insulating material, for example oxide, nitride, or the like.

According to another refinement, it is provided that the drive frame has a first partial region and a second partial region, the counterelectrode being connected to the first partial region, and a further counterelectrode of the detection arrangement corresponding to a further Coriolis electrode of the detection arrangement being connected to the second partial region, and the first partial region being electrically insulated with respect to the second partial region, and/or the counterelectrode being electrically insulated with respect to the further counterelectrode. A differential evaluation of the Coriolis deflection is thus advantageously possible. The Coriolis electrode and the counterelectrode, or the further Coriolis electrode and the further counterelectrode, are designed in particular as finger electrodes which intermesh along the first direction, or as capacitor plates which are oppositely situated along the first direction, so that either the overlap or the distance between the corresponding electrodes is varied via the Coriolis deflection.

According to another refinement, it is provided that the first partial region has a first section and a second section which is electrically insulated from the first section, the counterelectrode including a first counterelectrode which is connected to the first section and a second counterelectrode which is connected to the second section, and the second partial region having a third section and a fourth section which is electrically insulated from the third section, the further counterelectrode including a third counterelectrode which is connected to the third section, and a fourth counterelectrode which is connected to the fourth section. Interference signals resulting from torsion of the Coriolis element with respect to the drive frame are thus advantageously prevented.

According to another refinement, it is provided that the first and the third sections are at the same electric potential, and the second and the fourth sections are at the same electric potential, the second or the fourth section being situated along the drive frame between the first and the third section, so that a differential evaluation of the Coriolis deflection may be achieved comparatively easily with little complexity of contacting.

According to another refinement, it is provided that a further Coriolis deflection of the Coriolis element along a second direction which is perpendicular to the first and to the third direction may be detected using an additional detection arrangement, the additional detection arrangement including a further Coriolis electrode connected to the Coriolis element, and a corresponding further counterelectrode, both the further Coriolis electrode and the further counterelectrode being excitable to a vibration along the third direction. The yaw rate sensor thus advantageously includes a dual-channel sensor which is suitable for detecting yaw rates about a first rotational axis which is parallel to the first direction, and also for detecting yaw rates about a second rotational axis which is parallel to the second direction. It is advantageous that only a single Coriolis element is required, and the Coriolis electrode and the counterelectrode in the detection arrangement, or the further Coriolis electrode and the further counterelectrode in the additional detection arrangement, vibrate in synchronization with one another along the third direction, thus avoiding an adverse effect from interference signals.

A further subject matter of the exemplary embodiments and/or exemplary methods of the present invention is a yaw rate sensor system having a first and a second yaw rate sensor, the Coriolis element of the first yaw rate sensor being coupled to the Coriolis element of the second yaw rate sensor, and/or the drive frame of the first yaw rate sensor being coupled to the drive frame of the second yaw rate sensor. A differential evaluation of the yaw rate is thus advantageously possible, and undesired interfering influences due to linear accelerations of the yaw rate sensor system are minimized.

According to one refinement, it is provided that the coupling is designed to be rigid and/or spring-elastic. The Coriolis element of the first yaw rate sensor and the Coriolis element of the second yaw rate sensor thus advantageously vibrate along the third direction in phase opposition. This may be achieved using a rocker structure for a rigid coupling, or using an elastic coupling of the two drive frames.

According to another refinement, it is provided that the drive frame of the first yaw rate sensor and the drive frame of the second yaw rate sensor have a shared frame element, the yaw rate sensor system having a torsional axis which extends along the shared frame element. A comparatively compact implementation of the yaw rate sensor system may thus be advantageously achieved.

A further subject matter of the exemplary embodiments and/or exemplary methods of the present invention is a method for operating a yaw rate sensor, the Coriolis element being excited to a vibration along the third direction, and the Coriolis deflection of the Coriolis element along the first direction being detected using the detection arrangement, and both the Coriolis electrode of the detection arrangement and the counterelectrode of the detection arrangement being excited to a vibration along the third direction. Interfering influences due to a relative motion of the Coriolis electrode and the counterelectrode along the third direction are thus advantageously avoided.

Exemplary embodiments of the present invention are illustrated in the drawing and explained in greater detail in the following description.

DETAILED DESCRIPTION

Identical parts are always provided with the same reference numerals in the various figures, and therefore are generally designated or mentioned only once.

Figure 1:
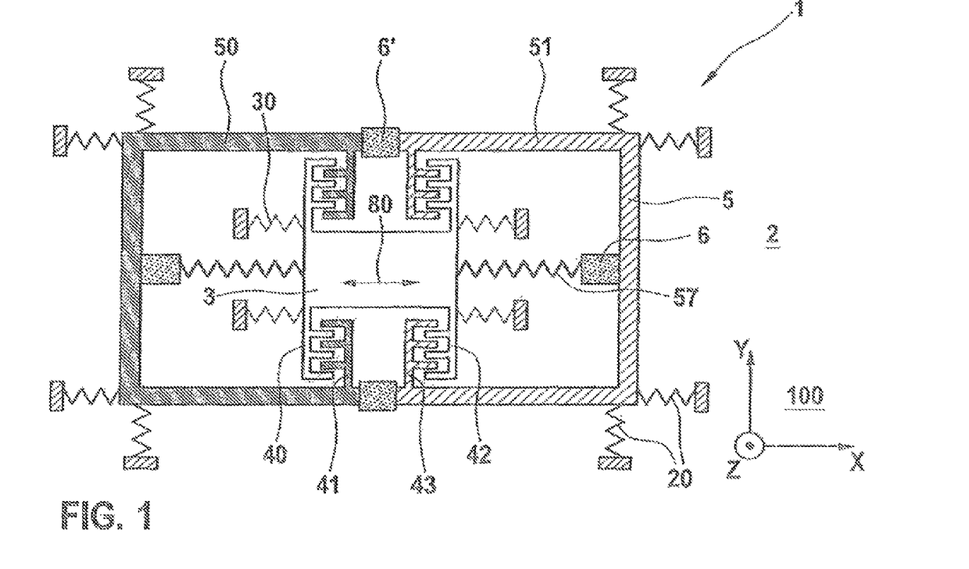
FIG. 1 shows a yaw rate sensor according to a first specific embodiment of the present invention.

FIG. 1 illustrates a schematic top view of a yaw rate sensor 1 according to a first specific embodiment of the present invention, yaw rate sensor 1 having a substrate 2 and a drive frame 5 which is coupled to substrate 2 via substrate springs 20. Substrate springs 20 are designed to be soft along a third direction Z which is perpendicular to a main plane of extension 100 of substrate 2, while the substrate springs are designed to be hard with respect to first and second directions X, Y, which are each perpendicular to third direction Z. First and second directions X, Y are mutually perpendicular. Drive frame 5 is fixed by substrate springs 20 with respect to a motion parallel to main plane of extension 100, and substrate springs 20 permit a motion of drive frame 5 perpendicular to main plane of extension 100. Drive frame 5 is connected to a Coriolis element 3 via frame springs 57, frame springs 57 being rigid with respect to third direction Z and being elastic with respect to first direction X, and insulating elements 6 being situated between frame springs 57 and drive frame 5 and being provided for electrically insulating Coriolis element 3 from drive frame 5. Drive frame 5 is excited to a vibration along third direction Z with the aid of drive elements (not illustrated), Coriolis element 3 likewise being excited to a vibration along the third direction via frame springs 57. Drive frame 5 is subdivided into a first partial region 50 and a second partial region 51 which is mirror-symmetrical with respect to first partial region 50, first and second partial regions 50, 51 being electrically insulated from one another via further insulating elements 6'. First partial region 50 has counterelectrodes 41, designed as finger structures, which are provided for engaging with corresponding Coriolis electrodes 40 of Coriolis elements 3, while second partial region 51 has further counterelectrodes 43, designed as finger structures, which are provided for engaging with corresponding further Coriolis electrodes 42 of Coriolis element 3. A yaw rate about a rotational axis which is parallel to second direction Y generates a Coriolis force which causes a Coriolis deflection 80 of Coriolis element 3 along first direction X. This Coriolis deflection 80 changes the overlap between Coriolis electrode 40 and counterelectrodes 41, and the overlap between further Coriolis electrodes 42 and further counterelectrodes 43, each being measurable as a change in the electrical capacitance. Coriolis element 3 is optionally anchored to substrate 2 via further substrate springs 30, further substrate springs 30 are designed to be soft along first and third directions X, Z and being designed to be hard along second direction Y. For illustrated yaw rate sensor 1, Coriolis electrodes 40 and further Coriolis electrodes 42, as well as counterelectrodes 41 and further counterelectrodes 43, advantageously vibrate along third direction Z. Frame springs 57 and/or substrate springs 20 are alternatively designed as U-springs.

Figure 2:
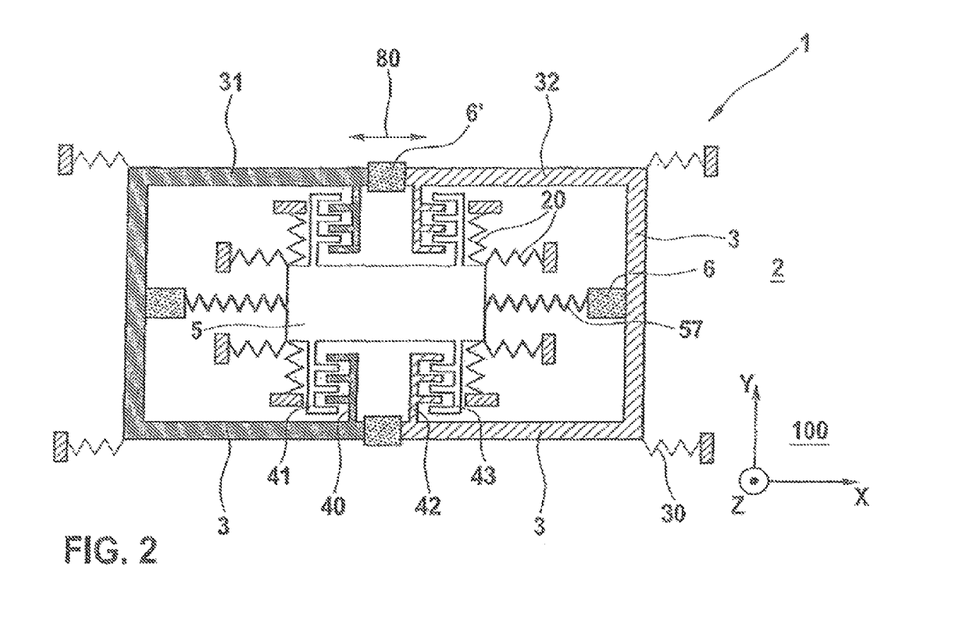
FIG. 2 shows a yaw rate sensor according to a second specific embodiment of the present invention.

FIG. 2 illustrates a schematic top view of a yaw rate sensor 1 according to a second specific embodiment of the present invention; in contrast to the first specific embodiment illustrated in FIG. 1, drive frame 5 is situated within Coriolis element 3, while Coriolis element 3 is designed as a framelike structure. Coriolis element 3 in turn is fastened to substrate 2 via further substrate springs 30, and is coupled to drive frame 5 via frame springs 57. Furthermore, drive frame 5 in turn is fastened to substrate 2 via substrate springs 20. In this case drive frame 5 is not subdivided into first and second partial regions 50, 51, and instead Coriolis element 3 is subdivided into two partial elements 31, 32 which are electrically insulated from one another via further insulating elements 6', so that Coriolis electrode 40 is electrically insulated from further Coriolis electrode 42.

Figure 3:
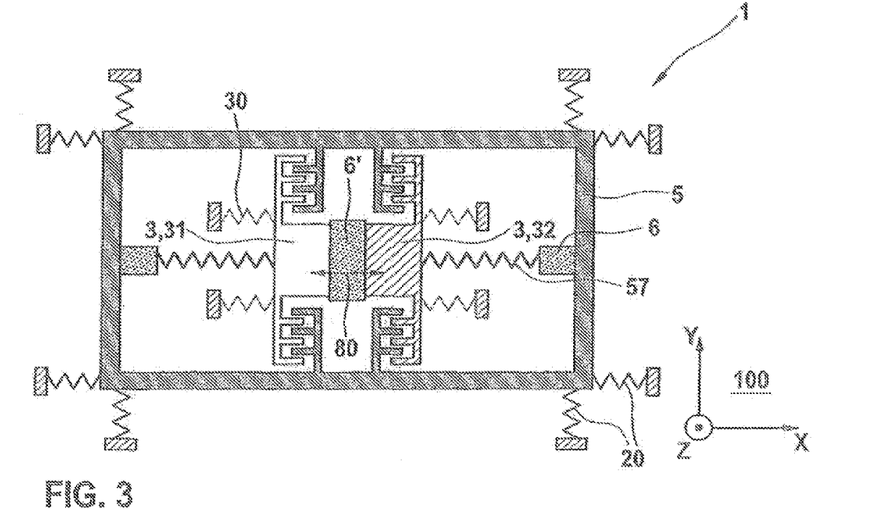
FIG. 3 shows a yaw rate sensor according to a third specific embodiment of the present invention.

FIG. 3 illustrates a schematic top view of a yaw rate sensor 1 according to a third specific embodiment of the present invention, the third specific embodiment essentially having the structure of the first specific embodiment, and, similarly as in the second specific embodiment, the drive frame is not subdivided into first and second partial regions 50, 51, but, rather, the Coriolis element is subdivided into two partial elements 31, 32.

Figure 4:
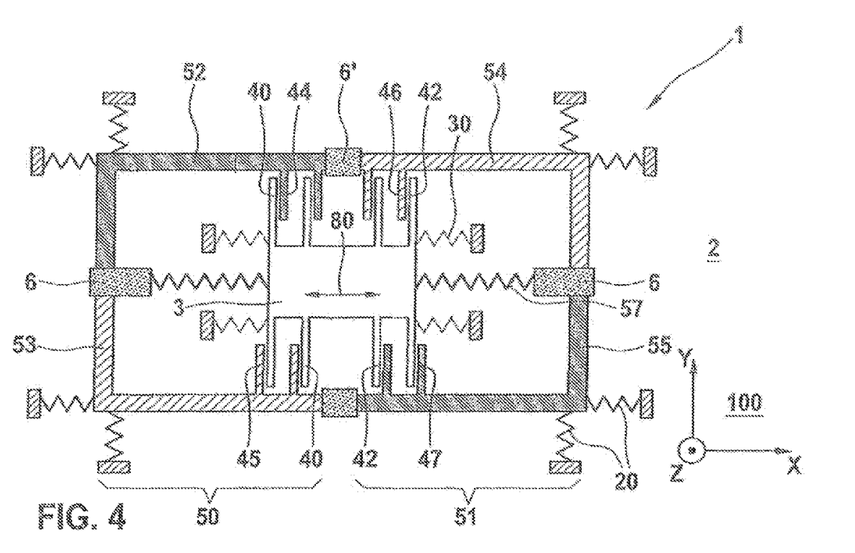
FIG. 4 shows a yaw rate sensor according to a fourth specific embodiment of the present invention.

FIG. 4 illustrates a schematic top view of a yaw rate sensor 1 according to a fourth specific embodiment of the present invention, the fourth specific embodiment being essentially the same as the first specific embodiment illustrated in FIG. 1, and detection arrangement 4 being designed not as intermeshing finger structures, but as plates of a plate capacitor. The change in the electrical capacitance for detecting Coriolis deflection 80 is therefore no longer caused by a change in the degree of overlap of the finger structures, but, rather, by a change in distance between the plates. In addition, first partial region 50 is separated into a first section 52 and a second section 53 which is insulated therefrom, and second partial region 51 is separated into a third section 54 and a fourth section 55 which is insulated therefrom. Counterelectrodes 41 therefore include a first counterelectrode 44 which is connected to first section 52, and a second counterelectrode 45 which is connected to second section 53, further counterelectrode 43 including a third counterelectrode 46 which is connected to third section 54, and a fourth counterelectrode 47 which is connected to fourth section 55. Insulating elements 6 are designed in such a way that they electrically insulate first and second sections 52, 53 and third and fourth sections 54, 55, respectively, from one another. First and fourth sections 52, 55 and second and third sections 53, 54 are optionally at the same electric potential.

Figure 5:
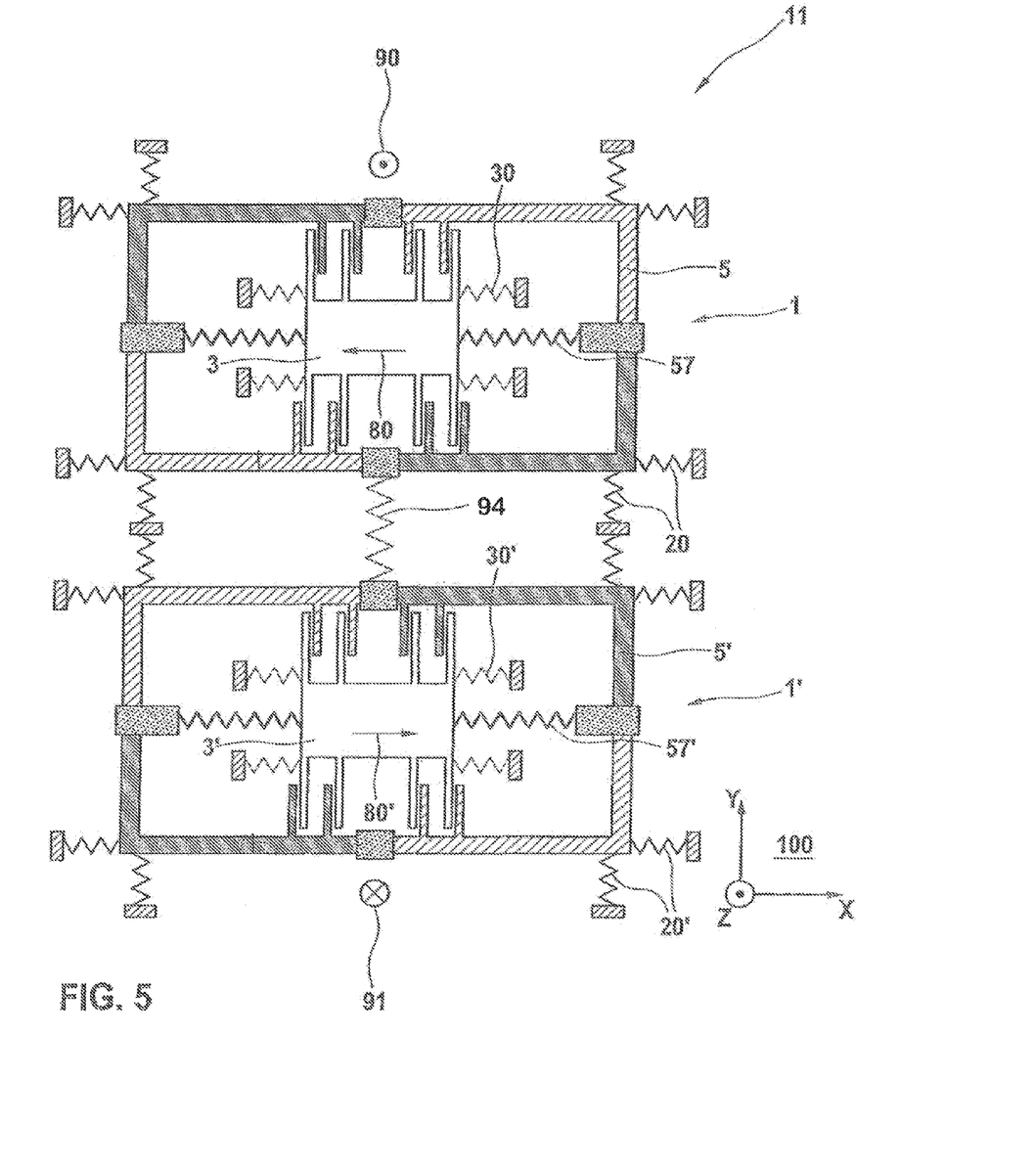
FIG. 5 shows a yaw rate sensor system according to a first specific embodiment of the present invention.

FIG. 5 illustrates a schematic top view of a yaw rate sensor system 11 according to a first specific embodiment of the present invention, yaw rate sensor system 11 having two yaw rate sensors 1, 1', i.e., a first and a second yaw rate sensor 1, 1' according to the fourth specific embodiment illustrated in FIG. 4, which are elastically coupled to one another via a coupling element 94. Vibration 91 of drive frame 5 or of Coriolis element 3 of first yaw rate sensor 1 along third direction Z is antiparallel and in phase opposition to vibration 91 of drive frame 5', or of Coriolis element 3' of second yaw rate sensor 1' along third direction Z, so that Coriolis deflection 80' of second yaw rate sensor 1' is also antiparallel and in phase opposition to Coriolis deflection 80 of first yaw rate sensor 1, and a differential measurement of the yaw rate is therefore made possible without interfering influences of a linear acceleration of yaw rate sensor system 11.

Figure 6:
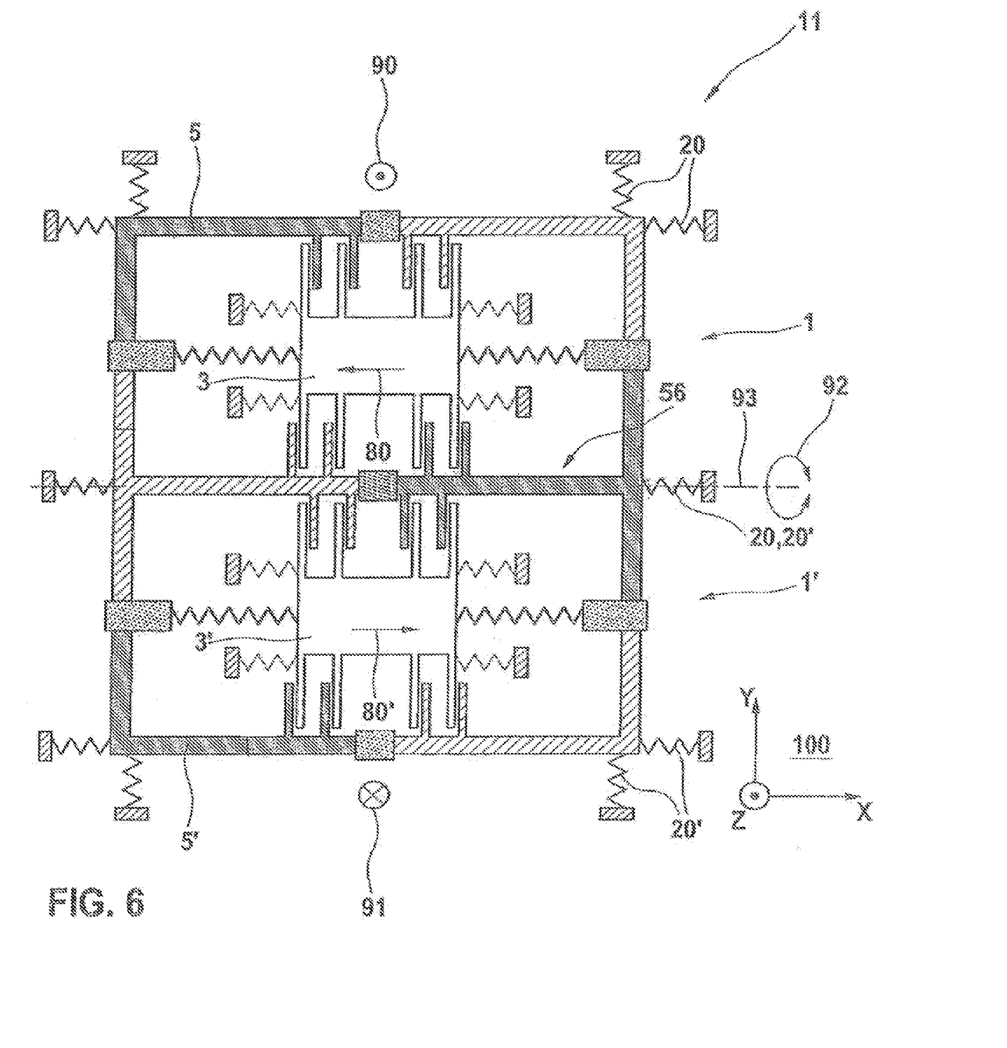
FIG. 6 shows a yaw rate sensor system according to a second specific embodiment of the present invention.

FIG. 6 illustrates a schematic top view of a yaw rate sensor system 11 according to a second specific embodiment of the present invention, the second specific embodiment essentially corresponding to the first specific embodiment illustrated in FIG. 5, first and second yaw rate sensors 1, 1' being fixedly coupled to one another and having a shared frame element 56. In this case, first and second yaw rate sensors 1, 1' undergo a mutual rotary vibration 92 about a torsional axis 93 which extends along shared frame element 56.

Figure 7:
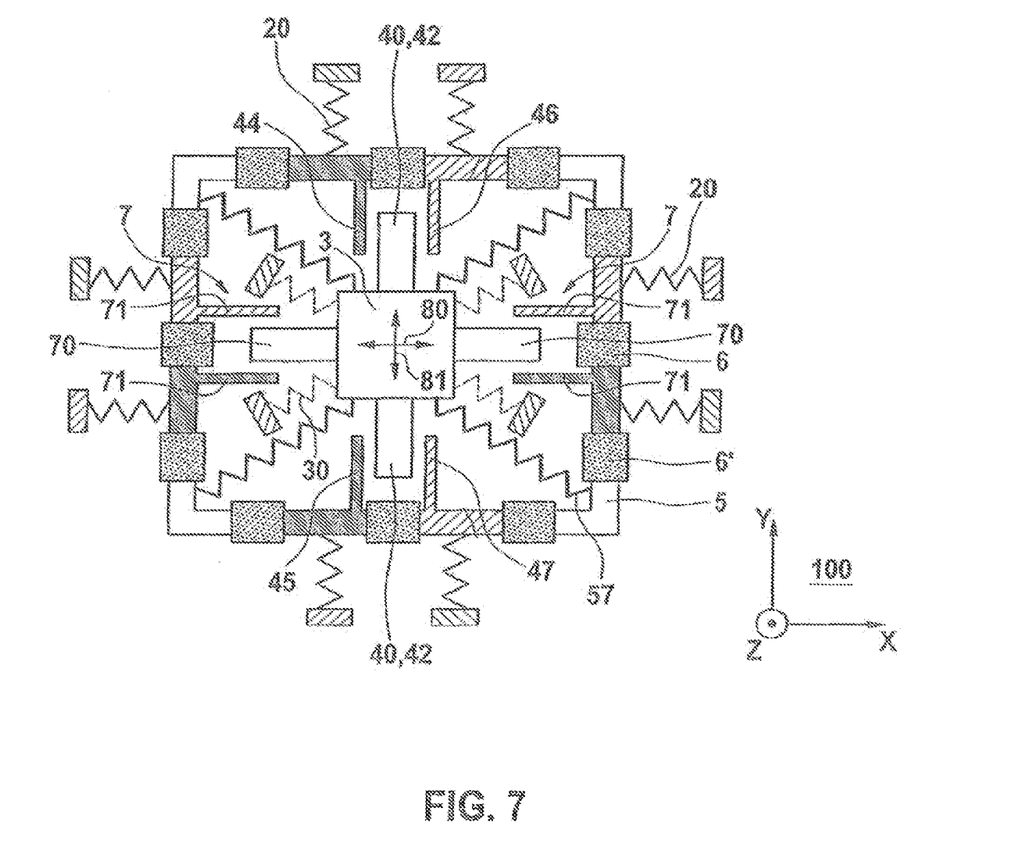
FIG. 7 shows a yaw rate sensor according to a fifth specific embodiment of the present invention.

FIG. 7 illustrates a schematic top view of a yaw rate sensor 1 according to a fifth specific embodiment of the present invention, the fifth specific embodiment being essentially the same as the fourth specific embodiment illustrated in FIG. 4, yaw rate sensor 1 having an additional detection arrangement 7 which is used for detecting a further Coriolis deflection 81 along second direction Y which is caused by a yaw rate having a rotational axis parallel to first direction X. Additional detection arrangement 7 includes two Coriolis electrodes 70 which are connected to Coriolis element 3 and which cooperate with further counterelectrodes 71 of drive frame 5.

Figure 8A:
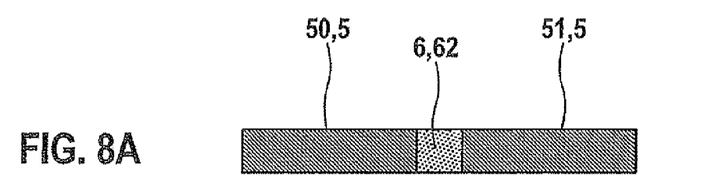
FIGS. 8a, 8b, 8c, 8d, 8e, 8f, 8g, and 8h show a partial region of a yaw rate sensor according to a sixth specific embodiment of the present invention.
Figure 8B:
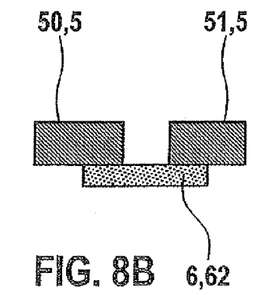
Figure 8C:
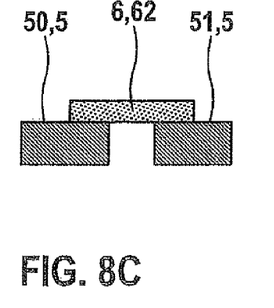
Figure 8D:
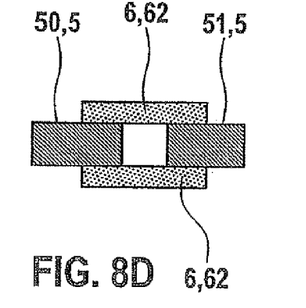
Figure 8E:
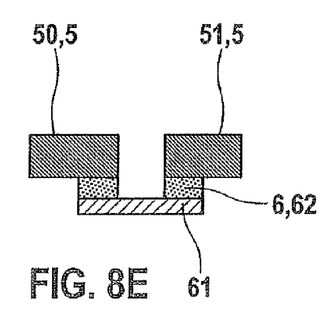
Figures 8F, 8G:
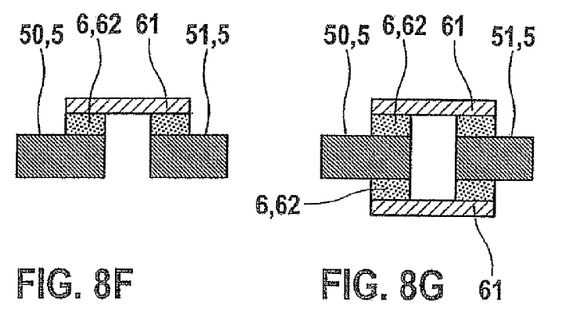
Figure 8H:
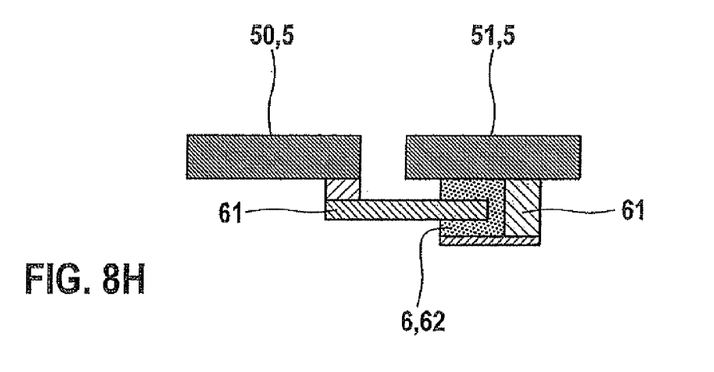

FIGS. 8a through 8h illustrate schematic views of partial regions of yaw rate sensors 1 according to a sixth specific embodiment of the present invention, partial regions having an insulation arrangement 6 which, for example, provide electrical insulation of first partial region 50 of drive frame 5 from second partial region 51 of drive frame 5. Insulation arrangement 6, i.e., the lateral layer, may include an insulating material 62, for example trench pits filled with oxide or amorphous SiGe, insulating material 62 may be situated below, above, or on both sides of the functional layer. In FIGS. 8e through 8h, insulation arrangement 6 also includes a conductive layer 61, which for example is situated below, above, or on both sides of the functional plane, insulating material 62 may be electrically insulating conductive layer 61 from the functional plane. The functional layer includes, for example, a first and a second partial region 50, 51 of drive frame 5. In FIG. 8h, conductive layer 61 is partially embedded in insulating material 62. The conductive layer may be embedded in an oxide, and a printed conductor plane situated therebelow is used as shielding from the oxide etching at this mechanical connection. The sacrificial layer etching is carried out in a time-controlled manner in such a way that the oxide remains to a sufficient degree on the mechanical connecting element.

What is claimed is:
1. A yaw rate sensor, comprising:
a substrate, which has a main plane of extension;
a detection arrangement; and
a Coriolis element, wherein the Coriolis element is excitable to a vibration along a third direction, which is perpendicular to the main plane of extension, wherein a Coriolis deflection of the Coriolis element along a first direction, which is parallel to the main plane of extension, is detectable using the detection arrangement;
wherein the detection arrangement includes a Coriolis electrode, which is connected to the Coriolis element, and a corresponding counterelectrode, and wherein the Coriolis electrode and the counterelectrode move together along the third direction responsive to the vibration along the third direction;
wherein the drive frame has a first partial region and a second partial region, wherein the counterelectrode is connected to the first partial region, and a further counterelectrode of the detection arrangement which corresponds to a further Coriolis electrode of the detection arrangement is connected to the second partial region, and wherein at least one the following is satisfied: (i) the first partial region is electrically insulated with respect to the second partial region, and (ii) the counterelectrode is electrically insulated with respect to the further counterelectrode; and wherein the first partial region has a first section and a second section, which is electrically insulated from the first section, wherein the counterelectrode included a first counterelectrode, which is connected to the first section, and a second counterelectrode which is connected to the second section, and wherein the second partial region has a third section and a fourth section which is electrically insulated from the third section, and wherein the further counterelectrode includes a third counterelectrode, which is connected to the third section, and a fourth counterelectrode, which is connected to the fourth section.

2. The yaw rate sensor of claim 1, wherein the yaw rate sensor has a drive frame, which is excitable to a vibration along the third direction and which is coupled to the Coriolis element, and wherein the counterelectrode is connected to the drive frame, and the counterelectrode is electrically insulated from the Coriolis element via an insulating element.

3. The yaw rate sensor of claim 1, wherein the first section and the third section are at a first same electric potential, wherein the second section and the fourth section are at a second same electric potential, and wherein one of the second section and the fourth section is situated along the drive frame between the first section and the third section.

4. The yaw rate sensor of claim 1, further comprising:

an additional detection arrangement, wherein a further Coriolis deflection of the Coriolis element along a second direction, which is perpendicular to the first direction and the third direction, is detectable using the additional detection arrangement, wherein the additional detection arrangement includes a further Coriolis electrode, which is connected to the Coriolis element, and a corresponding further counterelectrode, and wherein the further Coriolis electrode and the further counterelectrode are excitable to a vibration along the third direction.

* * * * *